United States Patent
Torizuka et al.

[11] Patent Number: 5,825,340
[45] Date of Patent: Oct. 20, 1998

[54] HEAD-MOUNTED IMAGE DISPLAY APPARATUS

[75] Inventors: Masami Torizuka, Kanagawa; Yoshiro Muraoka, Tokyo; Renshi Nakamura, Kanagawa, all of Japan

[73] Assignee: Sony Corporation, Japan

[21] Appl. No.: 701,192

[22] Filed: Aug. 21, 1996

Related U.S. Application Data

[63] Continuation of Ser. No. 135,352, Oct. 13, 1993, abandoned.

[30] Foreign Application Priority Data

Oct. 28, 1992 [JP] Japan .................... 4-289200

[51] Int. Cl.⁶ .................................. G09G 5/00
[52] U.S. Cl. ................................. 345/8; 345/87
[58] Field of Search .................... 345/7, 8, 9, 6, 345/5, 87; 351/158

[56] References Cited

U.S. PATENT DOCUMENTS

| | | | |
|---|---|---|---|
| H293 | 6/1987 | Task et al. | 351/243 |
| 4,257,062 | 3/1981 | Meredith | 345/8 |
| 4,257,691 | 3/1981 | Brooks | 351/158 |
| 4,482,326 | 11/1984 | Witt | 345/8 |
| 4,636,866 | 1/1987 | Hattori | 345/8 |
| 4,695,129 | 9/1987 | Faessen | 345/8 |
| 4,805,988 | 2/1989 | Dones . | |
| 5,034,809 | 7/1991 | Katoh . | |
| 5,106,179 | 4/1992 | Kamaya et al. . | |
| 5,276,471 | 1/1994 | Yamauchi et al. | 351/158 |

FOREIGN PATENT DOCUMENTS

| | | |
|---|---|---|
| 0454443 | 10/1991 | European Pat. Off. . |
| 0551781 | 7/1993 | European Pat. Off. . |
| 0 592 318 A2 | 4/1994 | European Pat. Off. . |
| 2647290 | 11/1990 | France . |
| 3256836 | 11/1991 | Japan ............. B41J 3/54 |

Primary Examiner—Xiao Wu
Attorney, Agent, or Firm—Ronald P. Kananen

[57] ABSTRACT

A head-mounted image display apparatus may be worn in a fashion similar to eyeglasses and is provided with left and right shutoff switches operable so that, when the left shutoff switch is operated, a left LCD is active to display a black surface image and a right LCD displays a test pattern, and vice versa. A user may thus easily effect focus and width adjustment without external input and without having to keep one eye closed during adjustment. Also provided are audio earphones and a detection circuit for detecting input of a three dimensional image signal. Also, a surround audio processing circuit is provided which is active according input of the three dimensional image signal.

31 Claims, 4 Drawing Sheets

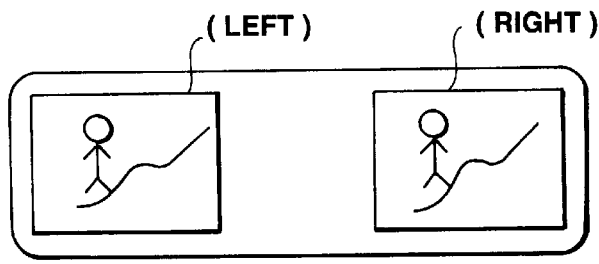
FIG.3(a)
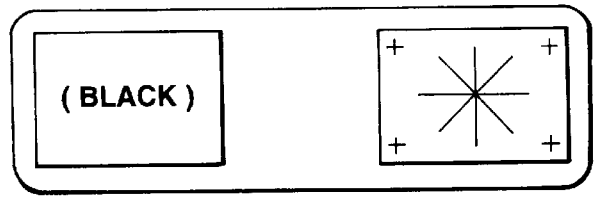
FIG.3(b)
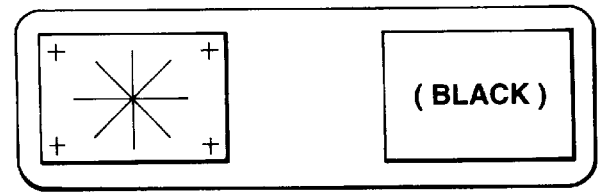
FIG.3(c)
FIG.4(a)　　FIG.4(b)　　FIG.4(c)
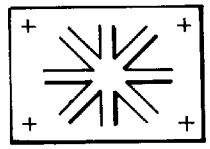 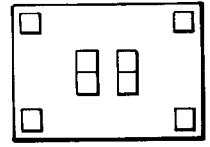 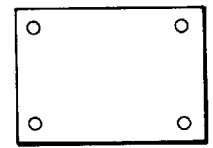
FIG.5(a)　　　　　FIG.5(b)
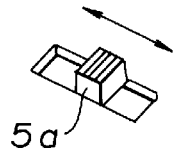 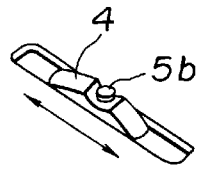

HEAD-MOUNTED IMAGE DISPLAY APPARATUS

This application is a continuation of application Ser. No. 08/135,352 filed Oct. 13, 1993, now abandoned.

BACKGROUND OF THE INVENTION

1. Field of the Invention

The present invention relates generally to a eyeglass type image display apparatus which permits monitoring of an image, such as a video or television image, in an immediate form via a pair of ocular lenses.

2. Description of the Prior Art

Various eye glass type image display devices, or 'head mounted' image displays, have been disclosed. Such apparatus generally includes a single LCD display panel to be viewed commonly by both eyes of a user or, a pair of LCD panels to be viewed by each eye separately. Such head mounted image displays may be used for three-dimensional (3-D) image effects, virtual reality applications or private viewing of video images or the like.

Also provided with such apparatus are one or two earphones for conveying sound associated with images displayed on the LCDs. The audio circuit for the earphones may be provided with a 'surround' circuit which is well known for improving presence. The surround circuit may have a switch for turning same on or off.

Japanese Patent Application (First Publication) No. 3-256836 discloses an image display device for display of 3-D images which alternately displays separate images for left and right viewing fields. It is noted that, since non 3-D image input does not require alternating field processing during display, a changeover switch is required for selecting between input of 3-D type image data and input of conventional image data.

In the above-described head mounted image display apparatus, which has separately disposed left and right LCD panels, it is necessary to focus each of the LCDs separately and to adjust the axis of each ocular lens to a center of a user's eye, so-called eye width adjustment in order to properly view a displayed image. However, some users experience difficulty in effecting such adjustments, since eye spacing between different users is different, and eye width and focus adjustments require that a user close one eye while focusing the image for the opposite eye. Also, for effecting such adjustments, external input of image data must be provided.

Further, there is an additional problem that some users experience confusion since such head-mounted image display devices have a plurality of adjustment controls such as eye width adjustment controls, focusing controls, surround sound switch, 3-D image switch, and the like.

Therefore, it has been required to provide a head mounted image display apparatus in which satisfactory focusing and eye distance adjustment can be easily and reliably carried out and which is simple of operability while providing high utility.

SUMMARY OF THE INVENTION

It is therefore a principal object of the present invention to overcome the drawbacks of the prior art.

It is a further object of the present invention to provide a head mounted image display apparatus in which satisfactory focusing and eye distance adjustment can be easily and reliably carried out.

It is also an object of the invention to provide a head mounted image display apparatus which is simple to operate and provides high utility.

In order to accomplish the aforementioned and other objects, a head-mounted image display apparatus is provided, comprising: first image display means; second image display means; and interrupt means engagable for discontinuing image display by a selected one of the first or second image display means.

According to another aspect of the invention, a head-mounted image display apparatus is provided, comprising: first image display means; second image display means; and display blackout means active to control a selected one of the first or second image display means to display a black image surface according to engagement thereof.

According to a still further aspect of the invention, a head-mounted image display apparatus is provided, comprising: left image display means; right image display means; left audio output means; right audio output means; and, a surround audio circuit selectively operable to process audio data supplied to the left and right audio output means.

BRIEF DESCRIPTION OF THE DRAWINGS

In the drawings:

FIGS. 3(a)–(c) are explanatory diagrams of left and right image fields in different operation modes of the first embodiment;

FIGS. 4(a)–(c) show examples of different test patterns which may be utilized for focusing operation of a head mounted display according to the invention;

FIGS. 5(a), (b) are perspective views of operating switches associated with the display apparatus of the first embodiment;

DESCRIPTION OF THE PREFERRED EMBODIMENT

Figure 1:
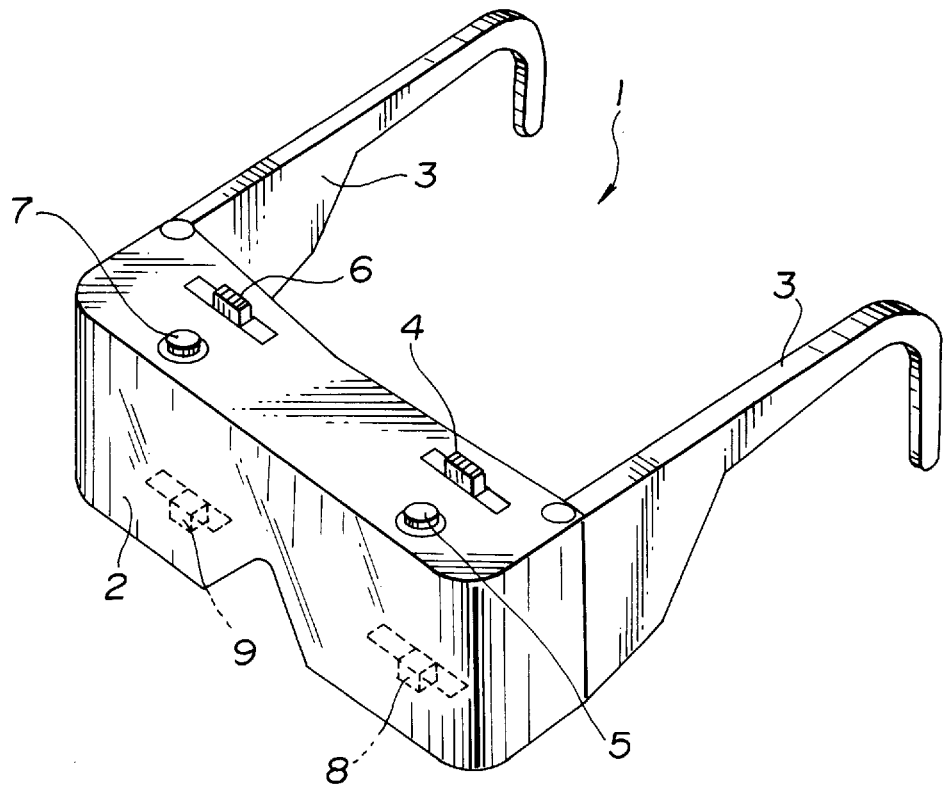
FIG. 1(a) is a perspective view of a head mounted image display apparatus according to a first preferred embodiment of the invention.
FIG. 1(b) is an explanatory diagram of an optical system associated with the display apparatus of the FIG. 1(a)
Figure 1:
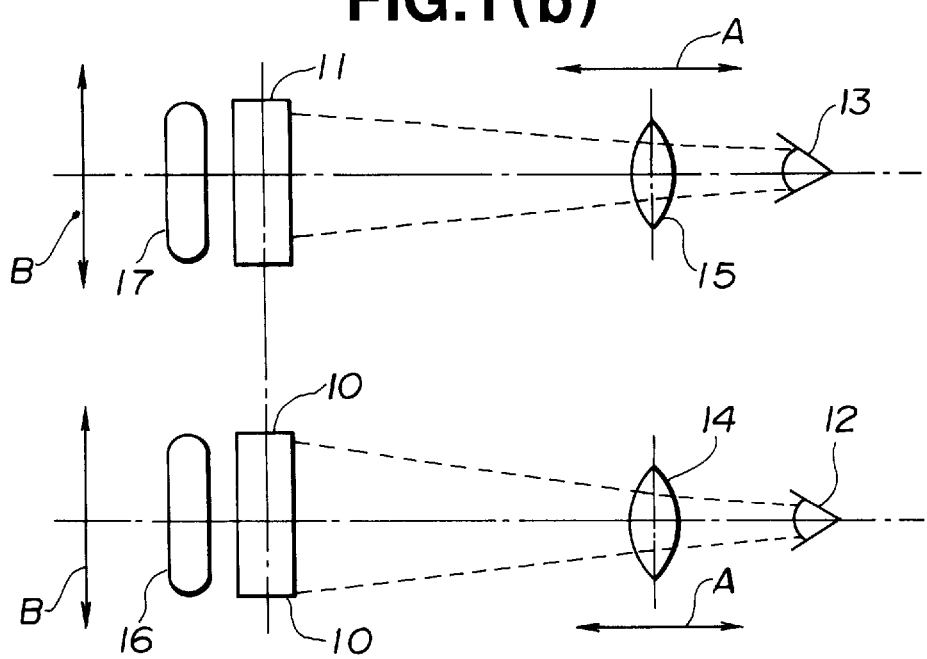

Referring now to the drawings, FIG. 1(a) shows a perspective view of a head-mounted image display apparatus 1 according to a first preferred embodiment of the invention.

The head-mounted image display apparatus 1 comprises a cabinet 2 (main body) having bows 3 at left and right sides thereof (hereinafter left and right shall correspond to point of view of a user wearing the head-mounted image display apparatus 1). On a top left surface of the cabinet 2, a left focusing slider 4 and a left calibration switch 5 are provided, while on a top right surface of the cabinet 2, a right focusing slider 6 and a right calibration switch 7 are disposed. On the bottom surface of the cabinet 2 left and right eye width adjusting knobs 8 and 9 are provided.

FIG. 1(b) is a plan view of an optical system mounted within the cabinet 2. As seen in the drawing, the optical system comprises left and right LCD (liquid crystal display)

panels 10, 11 with backlights 16 and 17 mounted behind the LCDs 10 and 11 respectively. Ocular lenses 14 and 15 are mounted in front of the LCDs 10, 11 respectively at positions between the LCDs 10, 11 and the eye positions 12, 13 indicative of the eyes of a user.

In effect, according to the above-described construction, two separate optical systems are provided, a left optical system comprising the backlight 16, the LCD 10 and the ocular lens 14 and a right optical system comprising the backlight 17, the LCD 11 and the ocular lens 15. The previously mentioned left and right focusing sliders 4 and 6 are active, according to movement thereof, to move respective ocular lenses 14, 15 in a direction A (FIG. 1(b)) along the axis of vision of the user so as to allow different users to focus the LCDs according to individual vision requirements. It will also be noted that, alternatively, the focusing sliders 4, 6 may be constructed so as to move the LCDs 10, 11 along the axial direction A while the ocular lenses 14, 15 remain stationary.

Further, the above mentioned eye width adjusting knobs 8 and 9 are active, according to movement thereof, to move the respective left and right optical systems in a direction B so as to enable individual users to adjust the spacing between the LCDs 10 and 11 according to their needs.

For further facilitating optimal focusing of the LCDs 10, 11, the left and right calibration switches 5, 7 provided on the upper side of the cabinet 2 operate as follows: when the left side calibration switch 5 is depressed, the left side LCD 10 displays a black screen while, when the right side calibration switch 7 is depressed, the system is operable to black out the right LCD 11 so that a user may focus a displayed image one eye at a time.

Further, according to the preferred embodiment, when the left side calibration switch 5 is depressed, the left side LCD 10 displays a black screen while the right LCD 11 displays a test pattern. On the other hand, when the right side calibration switch 7 is depressed, the system is operable to black out the right LCD 11 and to display a test pattern on the left LCD 10. Thus, individual focus may be established for each eye while both eyes remain open. In this manner, since the calibration switches 5 and 7 correspond to the side to be blacked out and are proximate the focusing sliders and adjustment knobs for each side respectively, adjustment of the head-mounted image display apparatus 1 according to the invention becomes intuitive and the apparatus is easy to use. Also, since, as described hereinlater, the head-mounted image display apparatus 1 may be provided with a character generator for providing a test pattern, focusing adjustments may be made when no external image signal is input.

Figure 2:
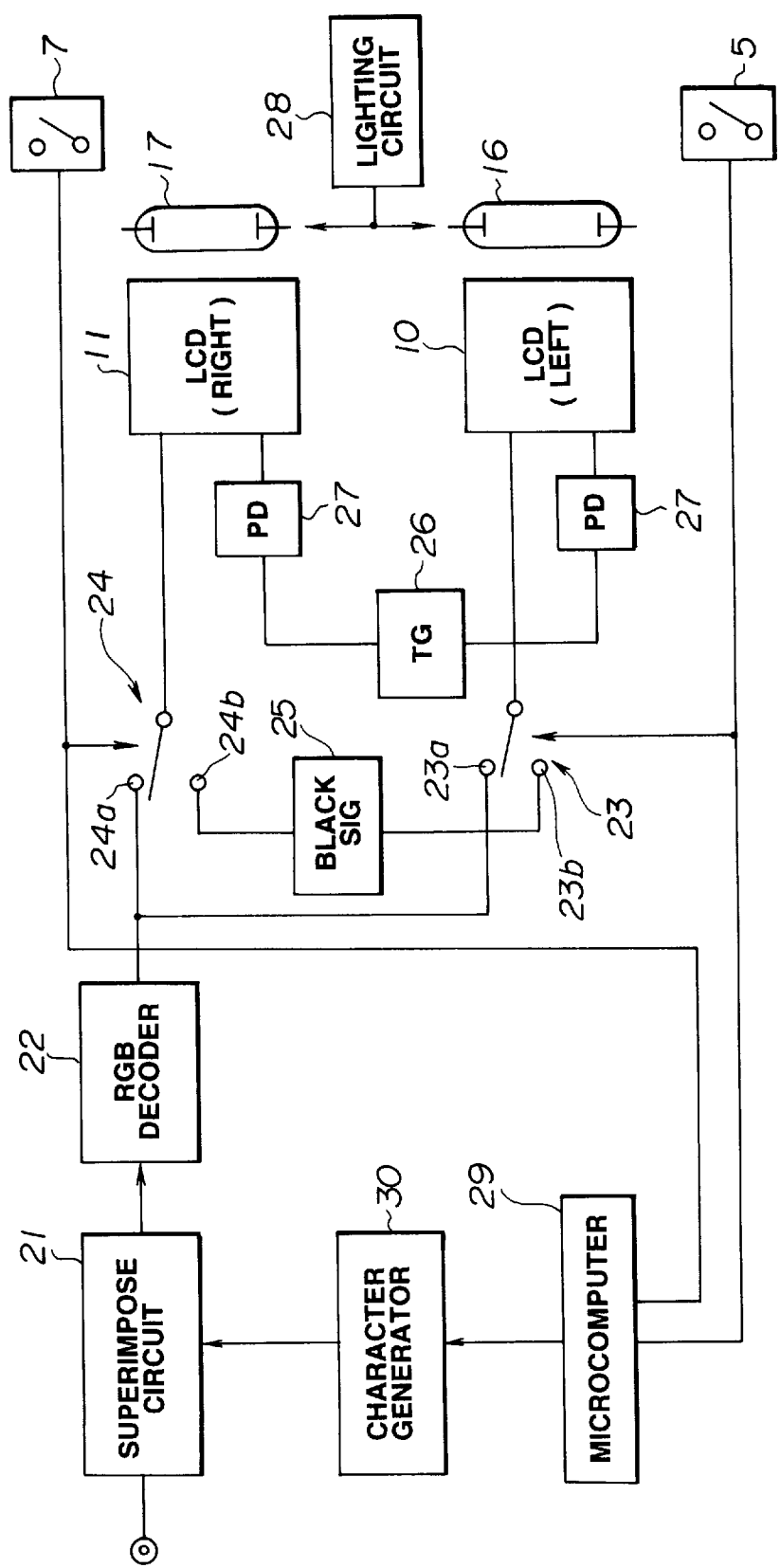
FIG. 2 is a block diagram of an electrical circuit of the first embodiment.

FIG. 2 shows a block diagram of an electrical circuit for effecting the above-described operation. As may be seen, FIG. 2 shows the left and right LCDs 10, 11, the left and right calibration switches 5, 7 as well as the backlights 16, 17. External video signals are input to an RGB decoder via a superimpose circuit 21. Switches 23, 24 are interposed between the output of the RGB decoder 22 and the left and right LCDs 10, 11 respectively and are normally connected to first terminals 23a, 24a allowing both LCDs 10, 11 to receive input image data from the RGB decoder. However, a black signal generator 25 is further provided and is connected to second terminals 23b, 24b of the switches 23, 24. When one of the switches 23 or 24 is switched to engage the second terminal 23b or 24b, a black signal is supplied to the associated LCD. Also provided are a character generator for providing test pattern images and a microcomputer for controlling calibration operations as will be explained hereinlater.

For facilitating display of 3-D images, the electrical circuit of FIG. 2 further shows a timing generator 26 (TG) associated with a pair of driving circuits 27, 27 which are interposed respectively between the timing generator 26 and one of the LCDs 10, 11. A lighting circuit 28 is also provided for controlling the backlights 16, 17.

According to the above construction, calibration operation of the head-mounted image display apparatus 1 according to the first preferred embodiment is carried out as described in detail hereinbelow.

When, for example, the left calibration switch 5 is switched ON, the left switch 23 is switched to the second terminal 23b for receiving a black screen input from the black signal generator 25, at this time a signal indicative of the ON state of the left calibration switch 5 is entered into the microcomputer 29 and a test pattern selected at the character generator 30 is sent to the right LCD 11 via the superimpose circuit 21 and the RGB decoder 22, since the right switch 24 remains connected to the first terminal 24a. At this time, input of external video image data is suspended.

When the right calibration switch 7 is turned ON the above operation is reversed such that the right LCD 11 becomes black and the test pattern is displayed on the left LCD 10. It will be noted that if both left and right calibration switches 5 and 7 are switched ON, both left and right LCDs 10 and 11 will display black screens, although it is alternatively possible to have both screens display the test pattern under this condition for confirmation of focusing.

Thus, normally, input video image data is displayed on both LCDs 10 and 11 as shown in FIG. 3(a), while, when the left calibration switch 5 is ON, images as shown in FIG. 3(b) are displayed on the LCDs 10 and 11, while, when the right calibration switch 7 is ON, images such as shown in FIG. 3(c) are displayed on the LCDs 10 and 11.

FIGS. 4(a)–4(c) show various types of test patterns which may be utilized for focusing operation. Optimally, a test pattern will indicate the center and four corners of the screen with figures, marks, letter or the like, or alternatively illustrations may be used to provide an object for focusing.

It will be noted that the calibration switches 5 and 7 need not be independent push button type switches as shown in FIG. 1. FIGS. 5(a) and 5(b) shown alternative constructions which may be utilized as calibration switches. FIG. 5(a) shows a single three-position calibration switch 5a. In a center position thereof, calibration operation is not engaged and the head-mounted image display apparatus 1 displays images in a normal manner (FIG. 3(a)), when moved to a left side position thereof the left calibration operation is carried out as described in connection with the calibration switch 5 hereinabove (FIG. 3(b)) and, when the opposite (right) side position thereof, the calibration switch 5a is active to initiate the right calibration operation as described hereinabove in connection with the right calibration switch 7.

Referring to FIG. 5(b), another alternative construction of the calibration switch is shown. According to this, a left calibration button 5b (and right calibration button 7b) is provided on an upper surface of the left focusing slider 4 (and the right focusing slider 6). According to this, the calibration switch may be held down concurrently with sliding of the slider for carrying out focusing. Thus operation is simplified and user convenience is enhanced.

Figure 6:
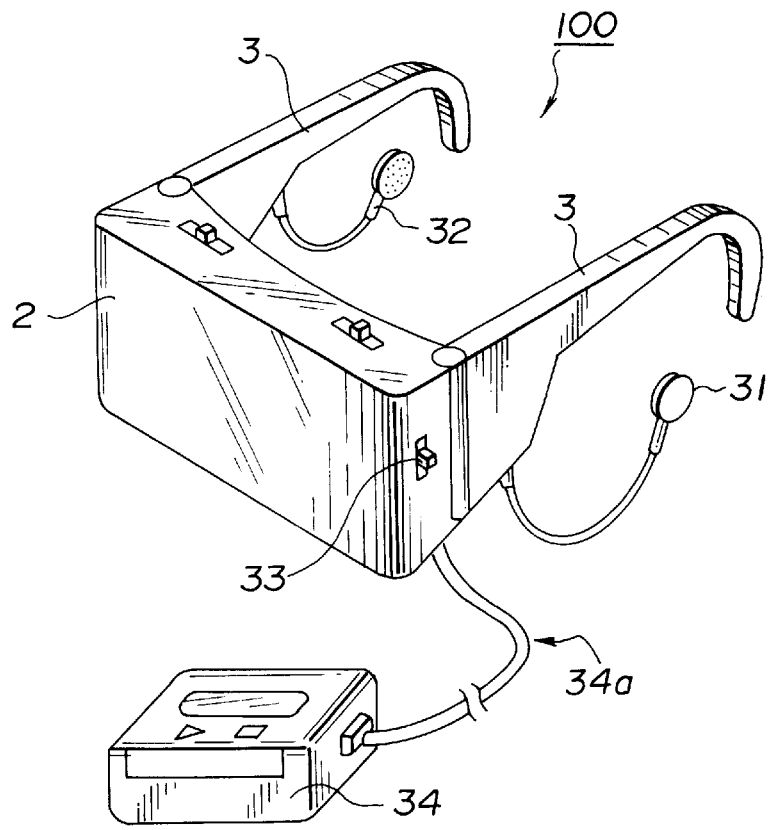
FIG. 6 is a perspective view of a head mounted image display apparatus according to a second preferred embodiment of the invention.

Hereinbelow, a second embodiment of a head-mounted image display apparatus 100 according to the invention will be described with reference to FIGS. 6 and 7.

Similarly to the first embodiment, the head-mounted image display apparatus 100 of the second embodiment comprises a main cabinet 2 having bows 3 attached at each side thereof for allowing the apparatus to be worn in a manner similar to eyeglasses. The present embodiment utilizes a parallax technique for providing 3-D imaging and is also equipped with left and right audio headphones 31, 32 and a surround 35 (FIG. 7) circuit for providing audio data to accompany input image data.

In addition, a mode switch 33 is provided on an outer side surface of the cabinet 2 for switching an operational mode between ordinary 2-D (two dimensional) image display mode and a 3-D image display mode. The head-mounted image display apparatus 100 may be connected to a VTR 34 via a connecting cable 34a or the like for providing external image data. The VTR 34 outputs a video signal and left and right audio signals L and R.

Figure 7:
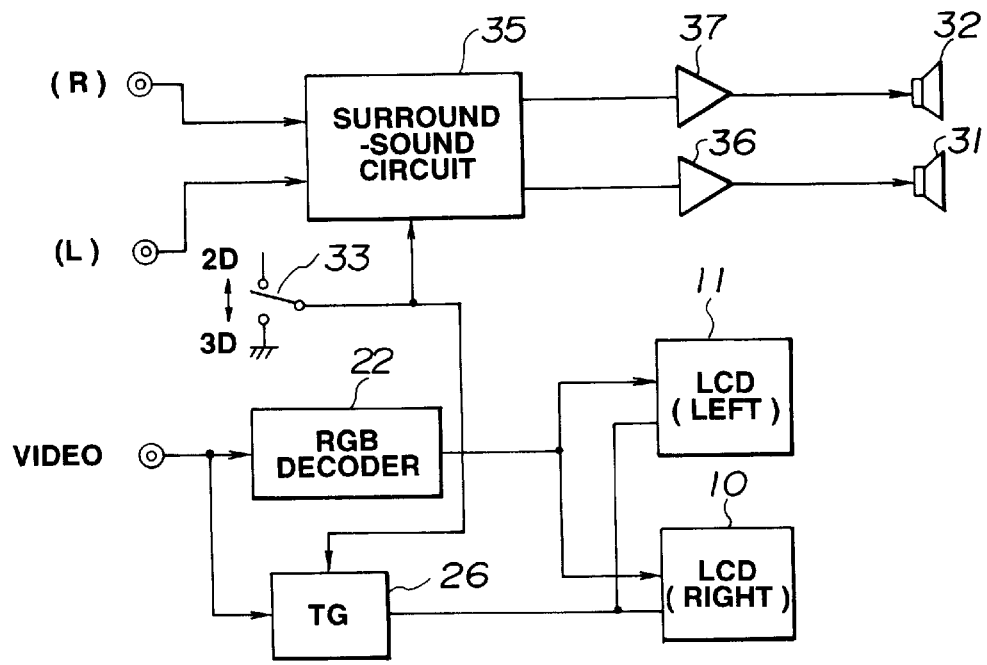
FIG. 7 is a block diagram of an electrical circuit according to the second embodiment.

Referring now to FIG. 7, the audio signal L and R are input to a per se known surround sound circuit 35 and from there are output to respective headphones 31 and 32 via amplifiers 36 and 37. The video signal is input to a timing generator 26 (TG) and, for being converted to image data for input to the left and right LCDs 10, 11, is also input to an RGB decoder 22. The timing generator is responsive to the position of the mode switch 33 to control the display mode of the LCDs 10, 11 according to a 2-D position, in which identical images are provided to left and right LCDs 10, 11, and a 3D position in which separate images having a parallax difference therebetween are respectively provided to left and right LCDs 10, 11 so as to create a 3-D effect. According to the present embodiment, the surround sound mode is activated synchronously with the 3-D position of the mode switch 33 such that surround audio processing is always provided simultaneously with a 3-D image signal. Thus, operation is simplified, since no separate controls need be provided for operation of the surround sound circuit.

When 3-D video data is received from the VTR 34, image data is sent to the left and right LCDs 10, 11 alternately, one field after another. If the 3-D position of the mode switch 33 is engaged at this time, the timing generator 26 is active to make synchronism detection and alternately control write/hold modes of the left and right LCDs 10, 11 according to the image fields on the incoming 3-D signal. That is, left field image data is provided to the left LCD 10 while the image of the previous field is held on the right LCD 11. Then, when right field image data is received, the image of the left LCD 10 is held while the new image data is provided to the right LCD 11. As stated above, when the 3-D mode is entered, the surround sound circuit automatically becomes active, thus three dimensional images and surround audio processing are simultaneously available and outstanding clarity and realism of the input image and audio data are provided to the user without need of complicated mechanisms or adjustments.

It will further be noted the the system of the above-described second embodiment may be implemented without provision of a manually operated mode switch 33. According to this modification, a 2-D or 3-D mode indicator may be recorded in a blanking period, for example, of the video signal such that the timing generator assumes the 3-D mode upon detection of a 3-D mode indicator of the incoming video signal. As with the above-described arrangement, the surround sound circuit may become active synchronously with the 3-D mode of the timing generator such that the head-mounted image display apparatus 100 automatically distinguishes between incoming 2-D or 3-D image data and the same advantages as obtained in the second embodiment are available while operation is further simplified.

Thus, according to the invention, a head-mounted image display apparatus is provided which provides excellent image and audio characteristics along with greatly enhanced convenience and simplicity for the user.

It will further be noted that mechanical shutters or other means of blacking out the LCDs 10, 11 may be implemented instead of the above proposed method.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A head mounted image display apparatus comprising:

first image display means directing a first image toward a user of the image display apparatus;

second image display means directing a second image toward the user of the image display apparatus;

display blackout means active to control a selected one of said first or second image display means to display a black image surface according to engagement thereof;

display control means operable such that, when said display blackout means is engaged, one of said first and second image display means which does not display said black surface image is active to display a test pattern;

first adjusting means for adjusting an optical condition of said first image display means; and second adjusting means for adjusting an optical condition of said second display means.

2. A head mounted image display apparatus as set forth in claim 1, wherein said display blackout means comprises black image generating means active to supply a black image signal to a selected one of said first and second image display means.

3. A head mounted image display apparatus as set forth in claim 1, wherein said display blackout means comprises a first blackout switch engagable for causing said first image display means to display said black image surface and a second blackout switch engagable for causing said second image display means to display said black image surface, and wherein said display control means is further operable such that, when both of said first and second blackout switches are engaged, a test pattern is displayed on both of said first and second image display means.

4. A head mounted image display apparatus as set forth in claim 1, further comprising:

first adjusting means for individually adjusting a focus of the first image directed toward the user by said first image display means; and second adjusting means for individually adjusting the focus of the second image directed toward the user by said second image display means.

5. A head-mounted image display apparatus comprising:

left image display means;

right image display means;

left audio output means;

right audio output means;

a surround audio circuit selectively operable to process audio data supplied to said left and right audio output means; and further including calibration means comprising:

left and right calibration buttons operable such that, when said left calibration button is depressed, said left image display means displays a black surface image and said right image display means displays a test pattern and, when said right calibration button is depressed said right image display means displays a black surface image and said left image display means displays a test pattern;

left adjusting means for adjusting an optical condition of said left image display means; and right adjusting means for adjusting an optical condition of said right image display means.

6. A head mounted image display apparatus as set forth in claim 5, further including three dimensional image detecting means operable such that, when three dimensional image data supplied to said left and right image display means is detected, an output of said three dimensional image detecting means is active to engage said surround audio circuit.

7. A head mounted image display apparatus as set forth in claim 5, wherein said left and right audio output means comprises left and right earphones.

8. A head mounted image display apparatus as set forth in claim 5, wherein said calibration buttons are provided on focusing sliders provided for focusing said image display means.

9. A head mounted image display apparatus comprising:

left image display means;

right image display means;

left audio output means;

right audio output means;

a surround audio circuit selectively operable to process audio data supplied to said left and right audio output means;

a calibration switch, said calibration switch having a first side position, a second center position, and a third side position and being operable such that, in said second position thereof calibration operation is not engaged and a normal image viewing mode is adopted, at said first side position said left image display means is controlled so as to display a black surface image and said right image display means is controlled so as to display a test pattern and, at said third side position said right image display means is controlled so as to display a black surface image and said left image display means is controlled so as to display a test pattern; and adjusting means for adjusting an optical condition of said first image display means and an optical condition of said second image display means, respectively.

10. A head mounted image display apparatus as set forth in claim 9, further including image processing means switchable between a first display mode in which a common video signal is supplied to each of said left and right image display means and a second display mode in which consecutive fields of a three dimensional image signal are supplied alternately to said left and right image display means respectively.

11. A head mounted image display apparatus as set forth in claim 10, further including manual switching means provided on an outer portion of said head-mounted image display apparatus for manually selecting between said first display mode and said second display mode.

12. A head mounted image display apparatus comprising:

a frame having a first stem and a second stem attached thereto for positioning the display apparatus on a user's head;

means for generating a test pattern image;

a first optical display system positioned within said frame in a first line of sight of the user, said optical display system providing a first visual image to the user;

a second optical display system positioned within said frame in a second line of sight of the user, said optical display system providing a second visual image to the user;

blackout means operatively coupled to said first optical display system and to said second optical display system for selectively blacking out at least one of said first visual image and said second visual image; and first adjusting means for adjusting said first optical display system;

second adjusting means for adjusting said second display system; and at least one mechanical switch means provided on said frame which is operable to select between at least a first mode and a second mode, said first mode being a mode in which said blackout means blacks out said second visual image and said generating means provides said test pattern image to said first optical display system, and said second mode being a mode in which said blackout means blacks out said first visual image and said generating means provides said test pattern image to said second optical display system.

13. The head mounted image display apparatus of claim 12, wherein said at least one mechanical switch means consists of a first depressible operating member and a second depressible operating member, the display apparatus operating in said first mode when said first operating member is depressed and operating in said second mode when said second operating member is depressed.

14. The head mounted image display apparatus of claim 12, wherein said at least one mechanical switch means comprises a single calibration switch movable among one of three positions consisting of a first position corresponding to said first mode, a second position corresponding to said second mode, and a third position corresponding to normal operation.

15. The head mounted image display apparatus of claim 12, wherein said first optical display system and said second optical display system are both focus adjustable with respect to the user, whereby said first mode facilitates focus adjustment of said first optical display system and said second mode facilitates focus adjustment of said second optical display system.

16. The head mounted image display apparatus of claim 15, further comprising a first focus adjustment member and a second focus adjustment member, said first focus adjustment member being operable to adjust the focus of said first optical display system, and said second focus adjustment member being operable to adjust the focus said second optical display system.

17. The head mounted image display apparatus of claim 16, wherein said at least one mechanical switch means consists of a first depressible operating member positioned on said first focus adjustment member and a second depressible operating member positioned on said second focus adjustment member, the display apparatus operating in said first mode when said first operating member is depressed and operating in said second mode when said second operating member is depressed.

18. The head mounted image display apparatus of claim 15, wherein each said first optical display system and said second optical display system include a LCD and a lens positioned along a common optical axis, said lens focusing an image displayed on said LCD, either of said LCD or said lens being movable along said optical axis to adjust the focus of the image with respect to the user.

19. The head mounted image display apparatus of claim 12, wherein said first optical display system and said second optical display system are separated from each other by a variable distance, said variable distance being adjusted by at least one adjustment knob.

20. The head mounted image display apparatus of claim 18, wherein said first optical display system and said second optical display system are separated from each other by a variable distance, said variable distance being adjusted by at least one adjustment knob.

21. The head mounted image display apparatus of claim 12, wherein said at least one mechanical switch selects among said first mode, said second mode and a third mode, said third mode being a mode in which said generating means provides said test pattern image to both said first optical display system and said second optical display system.

22. The head mounted image display apparatus of claim 12, wherein said generating means includes a microcomputer, a character generator and a superimpose circuit, said test pattern image being generated by said character generator and imposed on at least one said first visual image or said second visual image with said superimpose circuit according to control signals supplied from said microcomputer, said microcomputer generating said control signal on the basis of the operation of said mechanical switch means.

23. The head mounted image display apparatus of claim 18, further comprising a backlight which illuminates each LCD, wherein said LCD of said first optical display system provides said first image according to driving signals supplied from a first driving circuit, and said LCD of said first optical display system provides said first image according to driving signals supplied from a second driving circuit.

24. The head mounted image display apparatus of claim 12, further comprising at least one audio output device connected to the apparatus for providing audio signals to the user.

25. The head mounted image display apparatus of claim 24, wherein said at least one audio output device comprises a pair of audio headphones operatively coupled to a surround sound circuit.

26. The head mounted image display apparatus of claim 25, further comprising means for providing a three dimensional image to said first optical display system and said second optical display system.

27. A head mounted image display apparatus comprising:
first image display means directing a first image toward a first eye of a user of the image display apparatus;
first manual adjustment means for adjusting the first image produced by said first image display means;
second image display means directing a second image toward a second eye of the user of the image display apparatus;
second manual adjustment means for adjusting the second image produced by said second image display means;
a first display blackout means responsive to a first control signal for controlling said first image display means to display a black image and for controlling said second image display means to display a predetermined test pattern and enable adjustment of the second image using said second image display means; and
a second display blackout means responsive to a second control signal for controlling said second image display means to display a black image and for controlling said first image display means to display the predetermined test pattern and enable adjustment of the first image using said first image display means.

28. A head mounted image display apparatus as set forth in claim 27, further comprising means responsive to simultaneous generation of said first and second control signals to cause both of said first and second image display means to simultaneously display the predetermined test pattern.

29. A head mounted image display apparatus as set forth in claim 27, further comprising mode control means for switching image generating circuitry between a two dimensional image generation mode and a three dimensional image generating mode.

30. A head mounted image display apparatus as set forth in claim 29, wherein said mode control means is responsive to a signal produced by manual manipulation of a manually manipulable member.

31. A head mounted image display apparatus as set forth in claim 29, wherein said mode control means is responsive to a signal which is included in an incoming video signal.

* * * * *